US006284829B1

(12) United States Patent
Dalbe et al.

(10) Patent No.: US 6,284,829 B1
(45) Date of Patent: Sep. 4, 2001

(54) SILICONE ELASTOMER OF HIGH THERMAL CONDUCTIVITY

(75) Inventors: Bernard Dalbe, Lyons; Yves Giraud, Sainte-Foy-lés-Lyon, both of (FR)

(73) Assignee: Rhodia Chimie, Boulogne Billancourt Cedex (FR)

(*) Notice: Subject to any disclaimer, the term of this patent is extended or adjusted under 35 U.S.C. 154(b) by 0 days.

(21) Appl. No.: 09/590,803

(22) Filed: Jun. 9, 2000

Related U.S. Application Data

(63) Continuation of application No. 09/091,579, filed as application No. PCT/FR96/02042 on Dec. 20, 1996, now abandoned.

(30) Foreign Application Priority Data

Dec. 22, 1995 (FR) .................................................. 95 15776

(51) Int. Cl.[7] ....................................................... C08K 3/18
(52) U.S. Cl. ............................ 524/430; 524/432; 524/433
(58) Field of Search ................................... 524/430, 432, 524/433

(56) References Cited

U.S. PATENT DOCUMENTS

| 4,382,024 | * | 5/1983 | Seaman | 252/511 |
|---|---|---|---|---|
| 4,450,282 | * | 5/1984 | Ritzer | 556/472 |
| 4,518,655 | | 5/1985 | Henry et al. | 428/329 |
| 5,073,586 | * | 12/1991 | Berthet | 524/159 |
| 5,202,362 | * | 4/1993 | Hermele | 523/218 |
| 5,319,040 | * | 6/1994 | Wengrovius | 525/478 |

FOREIGN PATENT DOCUMENTS

56/000834  1/1981  (JP) ................................. C08K/3/22

* cited by examiner

*Primary Examiner*—Paul R. Michl
(74) *Attorney, Agent, or Firm*—Jean-Louis Seugnet

(57) ABSTRACT

The polyorganosiloxane composition resulting in a silicone elastomer of high thermal conductivity, which can reach and even exceed 1.2 W/m.K, the elastomer retaining an elongation at break of greater than 30%, comprises at least one functional polyorganosiloxane which crosslinks by a polyaddition or polycondensation reaction or by the radical route, optionally a polyorganohydrosiloxane, a catalyst, optionally a reinforcing filler and a filler intended to increase the thermal conductivity which is present in the composition in the proportion of 35 to 70% by volume with respect to the total composition, this filler comprising at least two groups of particles of very different mean diameters, a first group having a mean particle diameter of between 10 and 40 mm, present in a predominant amount in the filler, and a second group having a mean particle diameter of less than 5 mm.

13 Claims, No Drawings

SILICONE ELASTOMER OF HIGH THERMAL CONDUCTIVITY

This application is a continuation application of application Ser. No.: 09/091,579 filed on Oct. 26, 1998 abandoned which is a 371 of PCT/FR96/02042 filed Dec. 20, 1996.

The present invention relates to silicone elastomers of high thermal conductivity and to the organopolysiloxane compositions which enable them to be obtained. These elastomers are in particular applied in filling materials for heat transfer, in particular with respect to automobile components and components for domestic electrical appliances, in adhesives for electronic components and in two-component products used in moulding.

The thermal conductivity of composite materials is commonly obtained by incorporation of a large amount of filler. As a general rule, to have available a thermally-conducting silicone elastomer material, it is universally agreed that the level of filler by volume must be greater than 35–40% and not more than 65–70%. The nature of the filler is chosen according to its compatibility with the polymer matrix, its ease of incorporation and its own thermal conductivity.

The fillers are also chosen according to the final destination of the elastomer, which may be either electrically conducting or electrically insulating.

The main fillers used in silicone elastomers of high thermal conductivity are: Be, Si, Al, Zn, Mg, Fe and Ti oxides, boron, aluminium or silicon nitrides, silicon carbide, quartz, calcium carbonate, graphite, Ca and Mg fluorides and Al and Cu powders.

Japanese Patent JP-A-56/000834 describes the effect of the distribution of the size of the filler particles in the elastomer on the thermal conductivity of the latter. They use a trimodal distribution of alumina particles:

| Composition | Example 1 parts by weight | Example 2 parts by weight |
|---|---|---|
| Alumina, from 0.8 to 2.5 µm | 600 | 300 |
| Alumina, from 4 to 18 µm | 300 | 300 |
| Alumina, from 25 to 40 µm | 300 | 600 |
| Siloxane | 100 | 100 |
| Peroxide | 0.4 | 0.4 |
| % of filler in materials (mass) | 92.3 | 92.3 |
| % of filler in materials (volume) | 75 | 75 |
| Thermal conductivity (W/m.K) | 3.7 | 2.3 |

The authors find that the thermal conductivity is improved by the use of a greater amount of particles of small diameter.

However, the amount of fillers used in these elastomers is very large and the elastomeric properties are lost or greatly weakened. Indeed, this composition should not be regarded as being classifiable as a silicone elastomer.

Patent U.S. Pat. No. 4,518,655 describes a composition comprising an α,ω-hydroxypolydimethylsiloxane silicone oil, tabular alumina and calcined alumina. The tabular alumina is finely divided and must not exceed 100 mesh (i.e. approximately 168 µm), the finest being indicated at 325 mesh, i.e. a maximum size of approximately 48 µm. The example cites the use of tabular alumina with a size of between 100 and 325 mesh. As regards the calcined alumina, its size is less than one micrometre.

The main problem for thermally-conducting elastomers is thus the relationship between the amount of fillers incorporated, which is the factor which increases the thermal conductivity of the material, and the elastomeric properties, which are inversely proportional to the amount of fillers. The problem therefore becomes increasingly difficult to solve as the desired thermal conductivity increases.

Generally, true heat-conducting industrial silicone elastomers have a thermal conductivity, measured at 25° C. by the "Flash" method (N. J. Parker et al., J. of Applied Physics, 32, pp. 1679–1684, 1961), of between 0.8 and 1.2 W/m.K.

The object of the present invention is therefore to develop an elastomeric material of high thermal conductivity, which can reach and even exceed 1.2 W/m.K, which thus contains a high level of filler but which retains elastomeric properties and in particular an elongation at break (measured according to ISO standard R37 at 25° C. with H2-type test specimens) which is entirely satisfactory and in particular greater then 30%.

Another object of the invention is to develop such materials on the basis either of electrically conducting fillers or of fillers having electrically insulating properties.

In contrast to the teaching of the Japanese patent mentioned above, the Applicant Company has found, surprisingly, that the more the size of the particles of the filler was increased, the better was the thermal conductivity of the elastomeric material comprising it and that this conductivity, as well as the compactness of the material, could be further improved by the incorporation of smaller filler particles.

The Applicant Company has, in addition, found an optimum compromise between high thermal conductivity and elastomeric nature by limiting the size of the filler particles.

The Applicant Company has further observed a synergy effect resulting from the combination of large-sized particles, in a predominant amount, and of small-sized particles.

Finally, the achievement of the desired result involved the determination of the volume of filler to be incorporated, that is to say of the volume which will be occupied by the filler in the final elastomer.

The subject of the present invention is therefore a polyorganosiloxane composition resulting in a silicone elastomer of high thermal conductivity, which can reach and even exceed 1.2 W/m.K, the elastomer retaining an elongation at break of greater than 30%, comprising at least one functional polyorganosiloxane (I) which crosslinks by a polyaddition or polycondensation reaction or by the radical route, optionally a polyorganohydrosiloxane (II), a catalyst (III) and at least one pulverulent filler (IV) intended to increase the thermal conductivity of the final elastomer, as well as, optionally, a reinforcing filler (V), characterized in that the filler (IV) intended to increase the thermal conductivity is present in the composition in the proportion of 35 to 70% by volume, preferably of 45 to 65% and more preferentially still of 50 to 60%, with respect to the total composition and in that this filler comprises at least two groups of particles of very different mean diameters, a first group having a mean particle diameter of between 10 and 40 µm, preferably of 15 to 35 µm, present in a predominant amount in the filler, and a second group having a mean particle diameter of less than 5 µm, preferably of between 0.1 and 5 µm.

Preferably, when speaking of a group of particles having a mean diameter within a given range, it should be understood that more than 50% by weight of the particles have a diameter within the range (from 50 to 100% by weight of the particles).

Predominant amount is understood to mean in particular an amount of the order of 60 of 90% by volume, preferably of the order of 75 to 90% by volume, with respect to the total amount of fillers intended to increase the thermal conductivity.

According to an advantageous form of the invention, the small-sized particles can be distributed according to a bimodal distribution, in particular with a first mean diameter domain of between 1 µm and 5 µm, in particular of the order of 2 µm, and a second domain with a mean particle diameter of between 0.1 µm and 0.5 µm, in particular of the order of 0.2 µm.

The distribution between particles of the first domain and particles of the second domain is preferably from 85 to 95% by volume for the first particles and from 5 to 15% by volume for the second particles.

The preferred fillers (IV) are ground quartz, $Al_2O_3$, MgO, ZnO and mixtures of these.

The polyorganosiloxanes (I) and the optional polyorganohydrosiloxanes (II), the main constituents of the compositions according to the invention, are composed of siloxy units of general formula:

optionally all the other units being siloxy units of mean formula:

in which formulae the various symbols have the following meaning:
    the R symbols, which are identical or different, each represent a group of non-hydrolysable hydrocarbon nature, it being possible for this radical to be:
    an alkyl or haloalkyl radical having from 1 to 5 carbon atoms and containing from 1 to 6 chlorine and/or fluorine atoms,
    cycloalkyl and halocycloalkyl radicals having from 3 to 8 carbon atoms and containing from 1 to 4 chlorine and/or fluorine atoms,
    aryl, alkylaryl and haloaryl radicals having from 6 to 8 carbon atoms and containing from 1 to 4 chlorine and/or fluorine atoms,
    cyanoalkyl radicals having from 3 to 4 carbon atoms;
    the Z symbols, which are identical or different, represent a hydrogen atom, an alkenyl group, a hydroxyl group, a hydrolysable atom or a hydrolysable group;
    n=an integer equal to 0, 1, 2 or 3;
    x=an integer equal to 0, 1, 2 or 3;
    y=an integer equal to 0, 1 or 2;
    the sum x+y is between 1 and 3.

Mention may be made, by way of illustration, of the R organic radicals bonded directly to the silicon atoms: the methyl, ethyl, propyl, isopropyl, butyl, isobutyl, n-pentyl, t-butyl, chloromethyl, dichloromethyl, α-chloroethyl, α,β-dichloroethyl, fluoromethyl, difluoromethyl, α,β-difluoroethyl, 3,3,3-trifluoropropyl, trifluorocyclopropyl, 4,4,4-trifluorobutyl, 3,3,4,4,5,5-hexafluoropentyl, β-cyanoethyl, γ-cyanopropyl, phenyl, p-chlorophenyl, m-chlorophenyl, 3,5-dichlorophenyl, trichlorophenyl, tetrachlorophenyl, o-, p- or m-tolyl, α,α,α-trifluorotolyl and xylyl, such as 2,3-dimethylphenyl or 3,4-dimethylphenyl, groups.

The R organic radicals bonded to the silicon atoms are preferentially methyl, ethyl, propyl and phenyl radicals, it being possible for these radicals optionally to be halogenated.

The two-component or single-component organopolysiloxane compositions which crosslink at room temperature or on heating by polyaddition reactions, essentially by reaction of hydrosilyl groups with alkenylsilyl groups, generally in the presence of a metal catalyst, preferably containing platinum, are described, for example, in Patents U.S. Pat. Nos. 3,220,972, 3,284,406, 3,436,366, 3,697,473 and 4,340,709. The organopolysiloxanes which form part of these compositions are thus composed of pairs based, on the one hand, on at least one linear, branched or cyclic polysiloxane (I), composed of unit(s) (1) in which the Z residue represents a $C_2$–$C_6$ alkenyl group, preferably a vinyl group, which units are optionally combined with units (2), and, on the other hand, on at least one linear, branched or cyclic hydropolysiloxane (II), composed of units (1) in which the Z residue then represents a hydrogen atom, which units are optionally combined with units (2).

Generally, for this type of polyaddition composition,
    the Z symbols represent a hydrogen atom (compound II) or a $C_2$–$C_6$ alkenyl group (compound I);
    x=an integer equal to 1 or 2;
    y=an integer equal to 0, 1 or 2;
    the sum x+y is between 1 and 3;
    n=an integer equal to 0, 1, 2 or 3.

Examples of siloxy units of formula (1) where z=alkenyl are: the vinyldimethylsiloxy, vinylphenylsiloxy, vinylsiloxy and vinylmethylsiloxy units.

Examples of siloxy units of formula (1) where Z=H are: the $H(CH_3)_2SiO_{1/2}$, $HCH_3SiO_{2/2}$ and $H(C_6H_5)SiO_{2/2}$ units.

Examples of siloxy units of formula (2) are: the $SiO_{4/2}$, trimethylsiloxy, dimethylsiloxy, methylphenylsiloxy, diphenylsiloxy, methylsiloxy and phenylsiloxy units.

Examples of polyorganosiloxanes (I) are: dimethylpolysiloxanes with dimethylvinylsilyl ends, (methylvinyl)(dimethyl)polysiloxane copolymers with trimethylsilyl ends, (methylvinyl)(dimethyl)polysiloxane copolymers with dimethylvinylsilyl ends, methylvinylpolysiloxanes with dimethylvinylsilyl ends or cyclic methylvinylpolysiloxanes.

Examples of polyorganosiloxanes (II) are: (dimethyl)(hydromethyl)polysiloxane copolymers with trimethylsilyl ends, (dimethyl)(hydromethyl)siloxane copolymers with hydrodimethylsilyl ends, hydromethylpolysiloxanes with hydrodimethylsilyl ends or with trimethylsilyl ends, or cyclic hydromethylpolysiloxanes, all these compounds having per molecule at least three siloxy units carrying a hydrogen atom bonded to the silicon.

The compounds (I) generally have a dynamic viscosity at 25° C. of less than 500,000 mPa·s and preferably of between 100 and 100,000 mPa·s. The compounds (II) generally have a dynamic viscosity at 25° C. of less than 10,000 mPa·s and preferably of between 5 and 1,000 mPa·s.

Compounds (I) and (II) which are particularly well suited are essentially linear polyorganosiloxanes having viscosities such as those defined above comprising:
    for the compounds (I): α,ω-divinylated dimethylpolysiloxane oils, and
    for the compounds (II): hydromethylpolysiloxane oils with hydrodimethylsilyl ends or with trimethylsilyl ends.

In practice, each compound (I) and (II) can usually be formed of mixtures of oils having different characteristics.

The polyaddition composition can also comprise an extending polyorganosiloxane exhibiting, per molecule, two siloxy groups carrying a hydrogen atom bonded to the silicon. These extending polyorganosiloxanes are fully known to the person skilled in the art.

Two-component or single-component organopolysiloxane compositions which crosslink at room temperature by polycondensation reactions under the effect of moisture, generally in the presence of a metal catalyst, for example, a tin or titanium compound, are described, for example for single-component compositions, in Patents U.S. Pat. Nos. 3,065,194, 3,542,901, 3,779,986 and 4,417,042 and in Patent FR-A-2,638,752 and, for two-component compositions, in Patents U.S. Pat. Nos. 3,678,002, 3,888,815, 3,993,729 and 4,064,096. The organopolysiloxanes which form part of these compositions are generally linear, branched or crosslinked polysiloxanes composed of units (1) in which the Z residue is a hydroxyl group or a hydrolysable atom or group and where x is at least equal to 1, with the possibility of having at least one Z residue which is equivalent to a hydroxyl group or to a hydrolysable atom or group and at least one Z residue which is equivalent to a $C_2$–$C_6$ alkenyl group when x is equal to 2 or 3, the said units (1) optionally being combined with units (2). As regards the polysiloxane constituent containing units (1) and optionally (2), it can be an oil with a dynamic viscosity at 25° C. of between 200 and 500,000 mPa·s. Such compositions can in addition contain a crosslinking agent which is normally a silane carrying at least three hydrolysable groups, such as, for example, a silicate, an alkyltrialkoxysilane or an aminoalkyltrialkoxysilane.

The polycondensation composition can also comprise a silane carrying two hydrolysable groups and acting as extending silane. These difunctional silanes are fully known to the person skilled in the art.

It can also be (radical route) compositions which are curable at high temperature under the effect of organic peroxides, such as 2,4-dichlorobenzoyl peroxide, benzoyl peroxide, t-butyl perbenzoate, cumyl peroxide or di-t-butyl peroxide.

The organopolysiloxane taking part in such compositions (known under the term HVE=Heat Vulcanizable Elastomer) is then composed essentially of siloxy units (2), optionally combined with units (1) in which the Z residue represents a $C_2$–$C_6$ alkenyl group and where x is equal to 1 and does not contain hydrolysable groups or atoms. Such HVEs are, for example, described in Patents U.S. Pat. Nos. 3,142,655, 3,821,140, 3,836,489 and 3,839,266.

The dimethylpolysiloxanes terminated by trimethylsilyl or dimethylvinylsilyl groups represent a particularly important example of this category on an industrial level.

The polyorganosiloxane compositions according to the invention can also comprise the usual additives which make it possible to improve the use thereof.

The reinforcing fillers (V) are the fillers commonly used in polyorganosiloxane compositions. They generally have a mean particle diameter of less than 0.05 μm. They can be siliceous, in particular chosen from combustion or precipitation silicas, optionally treated with an organosilicon compound commonly used for this use. Methylpolysiloxanes, such as hexamethyldisiloxane or octamethylcyclotetrasiloxane, mjethylpolysilazanes, such as hexamethyldisilazane or hexamethylcyclotrisilazane, chlorosilanes, such as dimethyldichlorosilane, trimethylchlorosilane, methylvinyldichlorosilane or dimethylvinylchlorosilane, or alkoxysilanes, such as dimethyldimethoxysilane, dimethylvinylethoxysilane or trimethylmethoxysilane, figure among these compounds. Conventional non-siliceous fillers can also be used.

The polyorganosiloxane compositions according to the invention can also comprise the usual additives which make it possible to retain the elastomeric properties at a high level in applications where high temperatures are developed; mention will be made, for example, as additives of this type, of cerium oxide and cerium octoate (or 2-ethylhexanoate). Use may be made of 0.01 to 1% by weight of such additives with respect to the weight of the total composition.

A further subject of the present invention is silicone elastomers of high thermal conductivity obtained from the organopolysiloxane compositions according to the invention.

The invention will now be described in more detail using an implementational example of the invention.

Example of the preparation of a thermally-conducting elastomer with bimodal distribution of filler:

100 parts by weight of a 50/50 by weight mixture of α,ω-hydroxylated polydimethylsiloxane oils with viscosities of 3,500 mPa·s and 750 mPa·s are charged to a 5 1 arm mixer (Meilli type). 1.5 parts by weight of combustion silica with a specific surface of 150 m²/g and 2 parts by weight of cerium octoate containing 12% by weight of pure product are added. The mixture is mixed for approximately 30 minutes and then 50 parts by weight of Sifraco C600 are incorporated over 15 minutes. 350 parts by weight of Sifraco C10 are then incorporated over 45 minutes. The mixture is stirred under vacuum (53.2×10² Pa) for 1 hour and then 6 parts by weight of ethyltriacetoxysilane and 0.018 part by weight of titanium (isopropoxy)(butoxy)bis (acetylacetonate) are added. The mixture is mixed for 5 minutes under vacuum.

Sifraco C600 (mean diameter 2 μm; relative density 2.65) and C10 (diameter 25 μm; relative density 2.65) are composed of ground quartz and are sold by the company Sifraco—(Paris, France).

An elastomer with a relative density of 1.95 containing 57.8% by volume of ground quartz (composed of a mixture of 12.5% by volume of Sifraco C600 with 87.5% by volume of Sifraco C10) is obtained, the said elastomer having the following properties:

thermal conductivity: 1.28 W/m.K
tensile strength: 5.9 MPa
elongation at break: 50%
Shore A hardness: 88

What is claimed is:

1. A polyorganosiloxane composition crosslinking into a silicone elastomer of high thermal conductivity and an elongation at break of greater than 30%, consisting essentially of:

(1) one or more functional polyorganosiloxanes which is capable of crosslinking by a polyaddition reaction, a polycondensation reaction, or a radical reaction;

(II) optionally, a polyorganohydrosiloxane;

(III) a catalyst for the polyaddition reaction, a catalyst for the polycondensation reaction, or a catalyst for the radical reaction;

(IV) one or more pulverulent fillers selected from the group consisting of ground quartz, $Al_2O_3$, MgO, ZnO and their mixtures; and (V) optionally, a reinforcing filler;

wherein the amount of fillers (IV) is 35 to 70% by volume of the total composition and comprises at least two groups of particles of different mean diameters, a first group having a mean particle diameter of between 10 and 40 μm, present in a predominant amount in the fillers (IV), and a second group having a mean particle diameter of less than or equal to 5 μm.

2. A composition according to claim 1, wherein the amount of particles of the first group is of the order of 60 to 90% by volume with respect to the total amount of fillers (IV).

3. A composition according to claim 2, wherein the amount of particles of the first group is of 75 to 90% by volume with respect to the total amount of fillers (IV).

4. A composition according to claim 1, wherein the amount of fillers (IV) is of 45 to 65% by volume with respect to the total composition.

5. A composition according to claim 1, wherein the amount of fillers (IV) is of 50 to 60% by volume with respect to the total composition.

6. A composition according to claim 1, wherein the particles (IV) of the first group have a mean diameter of between 15 and 35 μm.

7. A composition according to claim 1, wherein the particles of the second group have a mean diameter of between 0.1 and 5 μm.

8. A composition according to claim 1, wherein the particles of the second group are distributed according to a bimodal distribution.

9. A composition according to claim 8, wherein the particles of the second group are distributed in a first domain corresponding to particles with a mean diameter of between 1 μm and 5 μm, and, in a second domain corresponding to particles with a mean diameter of between 0.1 μm and 0.5 μm.

10. A composition according to claim 9, wherein the particles of the first domain have a mean diameter of about 2 μm.

11. A composition according to claim 9, wherein the particles of the second domain have a mean diameter of about 0.2 μm.

12. A composition according to claim 9, wherein the particles of the first domain are present in the proportion of 85 to 95% by volume with respect to the total of the particles of the first and second domains.

13. A silicone elastomer of high thermal conductivity obtained from a polyorganosiloxane composition as defined in claim 1.

* * * * *